US012095905B2

United States Patent
Jiang et al.

(10) Patent No.: US 12,095,905 B2
(45) Date of Patent: Sep. 17, 2024

(54) AUTHENTICATING AN INTERMEDIATE COMMUNICATION DEVICE

(71) Applicant: HEWLETT PACKARD ENTERPRISE DEVELOPMENT LP, Houston, TX (US)

(72) Inventors: Yafeng Jiang, Beijing (CN); Jianpo Han, Beijing (CN); Guangzhi Ran, Beijing (CN)

(73) Assignee: Hewlett Packard Enterprise Development LP, Spring, TX (US)

( * ) Notice: Subject to any disclaimer, the term of this patent is extended or adjusted under 35 U.S.C. 154(b) by 319 days.

(21) Appl. No.: 17/461,390

(22) Filed: Aug. 30, 2021

(65) Prior Publication Data

US 2023/0068972 A1    Mar. 2, 2023

(51) Int. Cl.
*H04L 9/08*    (2006.01)
*H04L 9/32*    (2006.01)

(52) U.S. Cl.
CPC .......... *H04L 9/0827* (2013.01); *H04L 9/0825* (2013.01); *H04L 9/0866* (2013.01); *H04L 9/3247* (2013.01); *H04L 2209/12* (2013.01)

(58) Field of Classification Search
CPC ... H04L 9/0827; H04L 9/0825; H04L 9/0866; H04L 9/3247; H04L 2209/12; H04L 9/0894
See application file for complete search history.

(56) References Cited

U.S. PATENT DOCUMENTS

| | | |
|---|---|---|
| 7,185,204 B2 | 2/2007 | Narayanaswami et al. |
| 8,644,503 B2 | 2/2014 | Hickman et al. |
| 8,984,296 B1 | 3/2015 | Young |
| 2003/0212892 A1* | 11/2003 | Oishi .................. H04L 63/0421 713/153 |
| 2003/0228911 A1 | 12/2003 | Dernis et al. |
| 2004/0243815 A1* | 12/2004 | Tsukamura ............. G06F 21/10 713/193 |
| 2008/0046173 A1* | 2/2008 | Lappe ................ G01C 21/3438 701/533 |
| 2008/0132279 A1 | 6/2008 | Blumenthal |
| 2008/0189774 A1* | 8/2008 | Ansari .................... H04L 67/53 726/7 |
| 2011/0113235 A1 | 5/2011 | Erickson |

(Continued)

FOREIGN PATENT DOCUMENTS

WO    WO-2009073024 A1    6/2009
WO    WO-2021004825 A1    1/2021

*Primary Examiner* — Abu S Sholeman
(74) *Attorney, Agent, or Firm* — Hewlett Packard Enterprise Patent Department (57) ABSTRACT

Examples disclosed herein include accessing, by a host device, device information corresponding to an intermediate communication device communicatively coupled to the host device. Identifying, by the host device, a unique identifier corresponding to the intermediate communication device from the accessed device information. Query, by the host device, a public key from a remote resource, based on the identified unique identifier. Receiving, by the host device, the public key from the remote resource. Authenticating, by the host device, the intermediate communication device based on the received public key and a private key stored in the intermediate communication device.

20 Claims, 7 Drawing Sheets

(56) References Cited

U.S. PATENT DOCUMENTS

| | | |
|---|---|---|
| 2014/0258132 A1 | 9/2014 | Swamy et al. |
| 2018/0144634 A1* | 5/2018 | Kim .................... G08G 1/164 |
| 2019/0333058 A1* | 10/2019 | Hong .................. H04L 9/0637 |
| 2019/0379542 A1 | 12/2019 | Michal et al. |

* cited by examiner

AUTHENTICATING AN INTERMEDIATE COMMUNICATION DEVICE

BACKGROUND

As Internet of Things (IoT) continue to evolve at a rapid pace, IoT devices are becoming ubiquitous in domestic, enterprise, and other environments. IoT devices may include sensors for collecting data, which may be used for analysis and/or visualization of their deployment environment. The collected data may need to be securely transmitted to and stored in a target location, such as a cloud computing environment.

BRIEF DESCRIPTION OF THE DRAWINGS

The present disclosure, in accordance with various examples, is described in detail with reference to the following figures. The figures are provided for purposes of illustration only and merely depict examples, wherein.

The figures are not exhaustive and do not limit the present disclosure to the precise form disclosed.

DETAILED DESCRIPTION

IoT devices may be used as sensory units to perceive operating conditions of an organization in which they are deployed. The operating conditions may include but are not limited to environmental conditions such as temperature, pressure, etc., and network conditions such as status of a network device, a client device, connection, etc. This may be achieved by collecting data from an edge (e.g., at or near a physical location where the operating conditions are perceived). In some instances, based on data being collected, certain corrective or control actions can be taken in real-time. In some other instances, collected data may be sent to a target location for further analysis and based on the analysis corrective or control actions can be taken.

A host device, such as an access point, may be used to send data generated by IoT devices to a target location. In some instances, IoT devices may communicate with a host device through an intermediate device. The intermediate device may be used to leverage an existing network infrastructure that may not support direct communication with IoT devices. For example, IoT devices may use low power and low latency communication protocols, such as Zigbee. An intermediate device may receive data from IoT devices over these communication protocols. From the intermediate device, the data may be sent to an access point, which may connect such IoT devices to a network or the Internet.

A host device may have to authenticate an intermediate device, such as a USB device, for security reasons before commencing communication. Unauthenticated devices may cause a host device and the network that the host device is part of to be vulnerable to cyber-attacks. This may lead to a temporary or permanent disruption in services provided by the host device and/or other network devices that are part of the network.

Generally, Universal Serial Bus (USB) standard or other such communication protocols may offer poor authentication or may be devoid of an authentication mechanism between an intermediate device and a host device. Vendors of intermediate devices and host devices may rely on proprietary authentication processes, which may vary among vendors. For example, some solutions may provide an authentication mechanism by embedding unique identifier information into an intermediate device during manufacturing. A host device may obtain a list of unique identifiers and perform a matching operation to compare the embedded unique identifier with the list of unique identifiers, to authenticate the intermediate device. However, a unique identifier-based authentication may offer poor security since a unique identifier may be intercepted and counterfeited. Moreover, if intercepted, a list of unique identifiers may cause a major security breach of multiple devices that are listed.

In some other solutions, a public key infrastructure (PKI), a certificate (chain), etc. may be embedded into an intermediate device during manufacturing. The intermediate device may be a resource constraint device (e.g., memory and/or compute resources) and it may be loaded with certificates used for authentication. A host device may be loaded with certificates to authenticate the intermediate device based on the embedded certificate. Preloading root certificates on the host device is cumbersome, as various certificates or PKI information may have to be loaded from various manufacturers. The host device may have to handle various unique identifiers or certificates to even authenticate one intermediate device. Hence, the authentication process may be inefficient.

The present disclosure addresses the aforementioned technical shortcomings by providing a secure and efficient authentication mechanism for authenticating an intermediate communication device by a host device. According to some examples of the present disclosure, a unique identifier, and a public-private key pair may be generated for an intermediate communication device. The public key along with the unique identifier may be stored in a secure remote location, such as a cloud computing resource, a server, or an on-demand computing/storage infrastructure for securely storing public key information. The private key and the unique identifier may be securely stored on the intermediate communication device. In some examples, upon detecting an intermediate communication device by a host device, the host device may initiate an authentication process before allowing the intermediate communication device to operate. The authentication process may include the host device accessing device information corresponding to an intermediate communication device. For example, the device information may include a unique identifier, which is unique to the intermediate communication device. The host device may identify the unique identifier from the accessed device information. Based on the unique identifier, the host device may query public key information from a remote resource. The public key information may securely be received from a remote location. Based on the received public key information and a private key stored in the intermediate communication device, the host device may authenticate the intermediate communication device. For example, an asymmetric-key algorithm or the like may be used for authentication. In some examples, a host device may be configured to generate random data based on the public key information that it receives from the remote resource. The random data may be sent to the intermediate communication device for signing. The intermediate communication device may sign the random data using its private key stored therein. The signed random data (i.e., signed data) is received by the host device for authentication. The host device may use public key information for authenticating the signed data. Based on authentication, the host device may enable the intermediate communication device to perform communication operations. For example, data generated by IoT devices is received by the intermediate communication device and may be securely transmitted to a target location through the host device. In case of an unauthorized or unauthenticated device being identified by the host device, the intermediate communication device may be blocked, and a network/device administrator may be alerted.

Accordingly, examples discussed herein authenticate an intermediate device such as a USB device securely and efficiently based on local device information available thereon and device information fetched from a remote resource. Therefore, the authentication mechanism discussed herein can reduce or eliminate resource overhead and security snags associated with storing certificates, a list of unique identifiers, or a public key list on a host device. Illustrative examples demonstrate a mechanism for authenticating the intermediate device such that an existing infrastructure may be used for connecting IoT devices to a network/internet using a successfully authenticated device. Based at least in part on the unique identifier, public key information, and private key information, a device may be authenticated to allow the device to communicate data with the host device.

In some examples, a non-transitory machine-readable storage medium comprising instructions is provided. The instructions are executable by a processor of a host device, to access device information corresponding to an intermediate communication device communicatively coupled to the host device. The storage medium may include instructions to identify a unique identifier corresponding to the intermediate communication device from the accessed device information. Additionally, the storage medium may include instructions to query a public key from a remote resource, based on the identified unique identifier. The storage may include instructions also to receive the public key from the remote resource. The storage medium may include instructions also to authenticate the intermediate communication device based on the received public key and a private key stored in the intermediate communication device.

In some examples, a host device is provided. The host device comprises a non-transitory storage medium comprising instructions. The instructions are executable by a processor that causes the processor to access device information corresponding to an intermediate communication device that is communicatively coupled to the host device. The instructions also cause the processor to identify a unique identifier corresponding to the intermediate communication device from the accessed device information. The instructions also cause the processor to query a public key corresponding to the identified unique identifier from a remote resource. The instructions also cause the processor to receive the public key from the remote resource. The instructions also cause the processor to generate random data and send the random data to the intermediate communication device. The instructions also cause the processor to receive a signed data from the intermediate communication device and to authenticate the intermediate communication device based on the signed data and a private key stored in the intermediate communication device.

In some examples, an intermediate communication device is provided. The intermediate communication device may include a non-transitory storage medium comprising instructions. The instructions are executable by a processor causing the processor to enable access of device information, stored in the intermediate communication device, to a host device. The intermediate communication device is communicatively coupled to the host device. Additionally, the instructions are executable by the processor that cause the processor to receive random data generated based on the accessed device information from the host device. The instructions are executable by the processor that also causes the processor to sign the random data to generate a signed data using a private key stored in the intermediate communication device. Additionally, the instructions are executable by the processor that also cause the processor to communicate the signed data to the host device for authentication. Further features of the present disclosure are discussed based on the following examples.

The following detailed description refers to the accompanying drawings. Wherever possible, the same reference numbers may be used in the drawings and the following description to refer to the same or similar features. It is to be expressly understood, however, that the drawings are for the purpose of illustration and description only. While several examples are described in this document, modifications, adaptations, and other implementations are possible. Accordingly, the following detailed description does not limit the disclosed examples. Instead, the proper scope of the disclosed examples may be defined by the appended claims.

Figure 1:
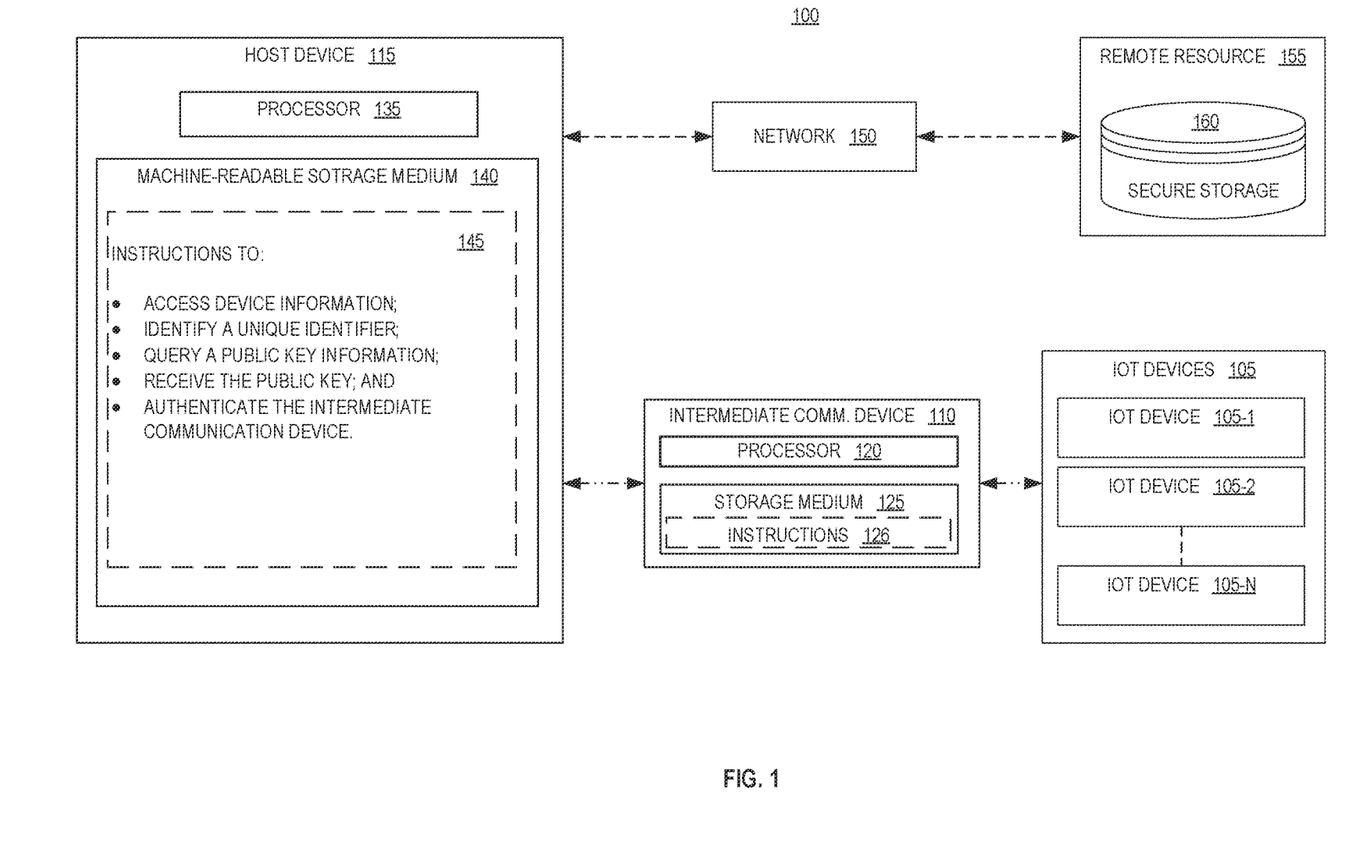
FIG. 1 illustrates an example network configuration, which may be implemented for an organization, according to some examples.

Now referring to figures, FIG. 1 illustrates an example network configuration 100, which may be implemented for an organization. The organization may be an enterprise, educational institution, governmental entity, healthcare facility, or other organization. The network configuration 100 includes one or more IoT devices 105-1, 105-2, . . . , 105-N (collectively referred by reference numeral '105'). The IoT devices 105 may be deployed in the organization to sense and record data corresponding to various parameters, such as environmental parameters (e.g., temperature, humidity, etc.), operating condition of network devices, etc. The IoT devices 105 may communicate the recorded data to an intermediate communication device 110.

The IoT devices 105 may include a general-purpose or specific-purpose sensory/computing device. The IoT devices 105 may include one or more of embedded electronics, a hardware processor, instructions executable by the hardware processor, sensors, actuators, and displays. Communication between the intermediate communication device 110 and the IoT devices 105 may be based on a communication protocol, such as Zigbee. For example, Zigbee communication protocol may operate based on the Institute of Electrical and Electronics Engineers (IEEE) 802.15.4 physical radio specification. The protocol may operate in unlicensed bands, including 2.4 GHz, 900 MHz, or 868 MHz. The IoT devices 105 communicate with the intermediate communication device 110 through the aforementioned protocol as per some examples. In some examples, the intermediate communication device 110 may include a USB device. The USB device may have wireless connectivity for connecting with the IoT devices 105.

Further, the intermediate communication device 110 may include a processor 120 and a storage medium 125. The storage medium 125 may be a non-transitory machine-readable type embedded with instructions 126, to perform one or more actions. The intermediate communication device 110 is communicatively coupled to a host device 115. For example, the intermediate communication device 110 may be plugged into the host device 115 by a universal serial bus (USB) port or any other port configuration. Additionally, the intermediate communication device 110 may have a detachable configuration. In some further examples, the intermediate communication device 110 is configured to perform a plug-and-play operation. In some other examples, the intermediate communication device 110 may connect to the host device 115, when placed within proximity to the host device 115, without any physical contact.

The host device 115 may authenticate the intermediate communication device 110, based on examples disclosed herein. The term "host device", as used herein, may refer to a networking device that allows client device(s) (e.g., IoT devices 105) to connect to a wired or wireless network. Host device 115 may include a processor 135, a non-transitory storage medium 140 embedded with instructions 145, and an input/output interface (not shown). Herein, the term 'interface' may include a physical radio, a physical port, software, hardware, firmware, circuitry, or a combination thereof. In some examples, the input/output interface may include wired network interfaces such as IEEE 802.3 Ethernet interfaces, as well as wireless network interfaces such as IEEE 802.11 Wi-Fi interfaces. The host device 115 is not intended to be limited to IEEE 802.11-based devices. It may include an electronic device that is adapted to allow wireless communication devices to connect to a wired network via various communication standards.

In some examples, the host device 115 may be communicatively coupled to a remote resource 155 via a network 150. Network 150 may include a wired or wireless high-speed network. The remote resource 155 may include a cloud computing resource capable of storing and computing information. In some examples, the remote resource 155 includes a secure storage 160 such as a server, a storage array, etc. The secure storage 160 may be configured to store device information corresponding to the intermediate communication device 110. In a further example, the host device 115 may be communicatively coupled to a local server (not shown) in lieu of a remote resource. Herein, "cloud computing" may refer to services that are associated with a "cloud," which may be, as examples, a public cloud, a private cloud, a virtual private cloud, a hybrid cloud, etc. The private cloud may be formed from an Internet-based network providing hosted cloud services that are generally available to members of the public. The private cloud may be formed from a private, limited access network, (such as an enterprise network) that provides hosted cloud services to a limited group of members. The virtual private cloud may be formed from a public network providing hosted cloud services to a limited group of members. The hybrid cloud may be formed from a combination of two or more of the aforementioned clouds.

In some examples, the host device 115 may authenticate the intermediate communication device 110 based on instructions 145. Instructions 145 may be executable by processor 135 to perform one or more actions as part of the authentication process. In some examples, the intermediate communication device 110 may include a non-volatile storage medium that stores device information, which includes a unique identifier. Instructions 145 may include instructions to access device information corresponding to the intermediate communication device 110 stored on its non-volatile storage medium. Instructions 145 may also include instructions to identify the unique identifier from the accessed device information. Based on the identified unique identifier, instructions 145 may include instructions to query public key information from the remote resource 155. The public key information may be stored in the secure storage 160. A private key may be stored in the intermediate communication device 110. Instructions 145 may also include instructions to authenticate the intermediate communication device 110 based on the public key information and the private key available with the intermediate communication device 110. The method/process of authentication by the host device is further elaborated in FIG. 2.

Figure 2:
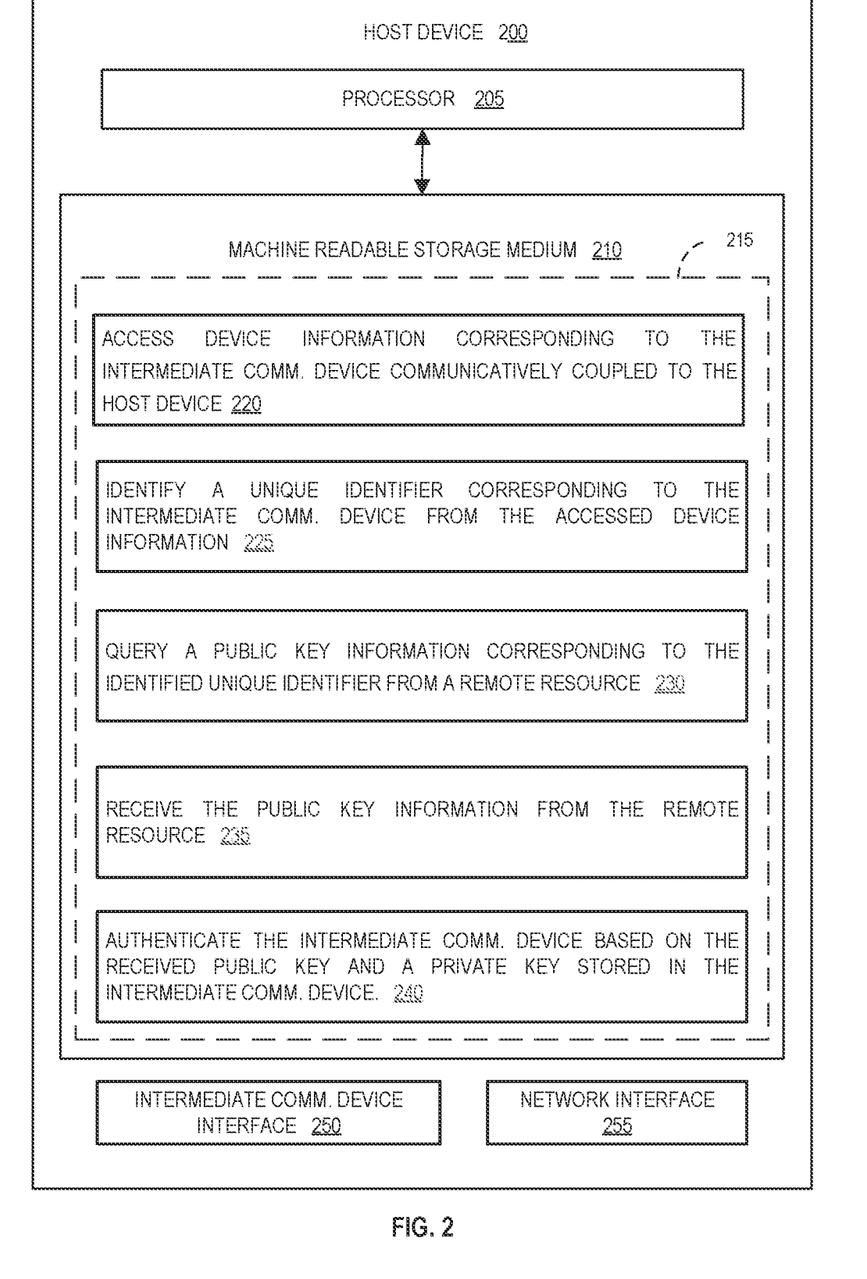
FIG. 2 illustrates an example schematic block diagram of a host device configured to authenticate an intermediate communication device, according to some examples.

FIG. 2 illustrates an example schematic block diagram of a host device 200 configured to authenticate an intermediate communication device, according to some examples. The host device 200 may include an access point, a router, a gateway, or any other network or computing device that facilitates communication with a network. In some examples, the host device 200 may include a processor 205 and a machine-readable storage medium 210. The machine-readable storage medium 210 may be encoded with the executable instructions 215. The instructions when executed by processor 205, cause the processor 205 to perform one or more methods, as discussed in detail herein.

In some examples, processor 205 executes instructions 220 that cause the processor 205 to access device information corresponding to an intermediate communication device. Examples of device information may include device descriptors such as a unique identifier, manufacturer details, standards supported by the intermediate device, etc. that may be stored in the intermediate communication device. The intermediate communication device may include a non-volatile storage medium for storing the aforementioned descriptor-related information. In some examples, the processor 205 may execute instructions that cause the processor 205 to cause a dedicated hardware circuitry and/or software code for accessing the device information. In some additional examples, the device information may be accessed based on a communication standard/protocol supported by the host device 200 and the intermediate communication device. In some examples, an intermediate communication device may be physically plugged into the host device 200. The intermediate communication device may support a plug-and-play or a plug-and-configure operation. A plug-and-configure operation may cause certain software and/or drivers to be installed on the host device 200 in response to a plugging in of the intermediate communication device to the host device 200. In further examples, the intermediate communication device may be communicatively coupled to the host device 200 without physical contact, using a wireless standard such as Wi-Fi (IEEE 802.11) operating in 2.4 Ghz, 5 Ghz, or 6 Ghz bands.

In some examples, processor 205 may execute instructions 225 that cause the processor 205 to identify a unique identifier corresponding to the intermediate communication device, from the accessed device information. In one example, the unique identifier may include a serial number that is unique to an intermediate communication device.

From the accessed device information, the host device may identify the unique identifier (e.g., serial number, or a combination of numbers and alphabets). In some examples, the processor 205 may execute instructions 225 that cause the processor 205 to activate a dedicated circuitry and/or identification algorithm for identification of the unique identifier.

In some examples, processor 205 may execute instructions 230 that cause the processor 205 to query public key information corresponding to the identified unique identifier via a secure connection from a remote resource. In one example, the remote resource may include a cloud computing resource with computing and/or storage capabilities, which can be accessed by a secure network. In alternative examples, a local server may assume the function of a remote resource. For example, organizations without continuous access to a cloud computing resource may fetch and store the public key information in the local server. In such examples, the host device 200 may query the public key information from the local server. In some examples, the host device 200 may be configured with information corresponding to the local servers and/or credentials. Alternatively, a backend control service may be configured to push local server information and/or credentials to the host device 200.

In some examples, processor 205 may execute instructions 235 that cause the processor to receive the public key information from the remote resource via a secure connection. The secure connection may include encryption, authentication, and/or certificate verification operations to authenticate the host device 200 by the remote resource. In some examples of the host device 200 and the remote resource may be co-located devices within a secure network that may require encryption of information by one or more security protocols for the secure flow of information between the remote resource and the host device 200. In alternate examples, a remote resource may include a cloud computing resource, which may be an existing resource or an on-demand infrastructure (Infrastructure as a Service/IaaS—for storage and computing). The remote resource may be associated with the host device 200. In some examples, the remote resource may receive device information directly from the device manufacturer, which is further elaborated in FIG. 4.

In some examples, processor 205 may execute instructions 240 to authenticate the intermediate communication device based on the received public key and a private key stored in the intermediate communication device. The authentication may be based on, but not limited to, an asymmetric-key algorithm. However, within the scope and spirit of the present disclosure, other authentication algorithms may be used.

As per one or more examples discussed herein, the host device 200 may securely receive public key information associated with an intermediate device of interest. Further, the public key information is received based on the identification of a unique identifier.

In some examples, the host device 200 may include intermediate communication device interface 250 (hereinafter, referred to as ICD interface, for brevity) and a network interface 255. The host device 200 may communicate with the intermediate communication device, such as a USB device, via the ICD interface 250. The host device 200 may connect to a network/internet via the network interface 255.

Further, the machine-readable storage medium 210 may store data and/or executable instructions 215. For example, the machine-readable storage medium 210 may be any electronic, magnetic, optical, or other physical storage device. In some examples, the machine-readable storage medium 210 may include one or more of a Random-Access Memory (RAM), an Electrically Erasable Programmable Read-Only Memory (EEPROM), a storage drive, a flash memory, a Compact Disc Read-Only Memory (CD-ROM), and the like. The machine-readable storage medium 210 may be non-transitory.

The processor 205 may be a physical device, for example, one or more central processing units (CPUs), one or more semiconductor-based microprocessors, one or more graphics processing units (GPUs), application-specific integrated circuit (ASIC), a field-programmable gate array (FPGA), other hardware devices capable of receiving and executing instructions 215 stored in the machine-readable storage medium 210, or combinations thereof. The processor 205 may fetch, decode, and execute the instructions 215 stored in the machine-readable storage medium 210 to perform authentication of intermediate storage device, as described herein. Instructions 215 that, when executed by processor 205, may at least partially implement some or all functions of host device 200, as per present disclosure.

As an alternative or in addition to executing the instructions 215, the processor 205 may include at least one integrated circuit (IC), control logic, electronic circuits, or combinations thereof that include a number of electronic components for performing the functionalities intended to be performed by the host device 200. Moreover, in certain examples, where the host device 115 may be a virtual machine or a containerized application.

Figure 3:
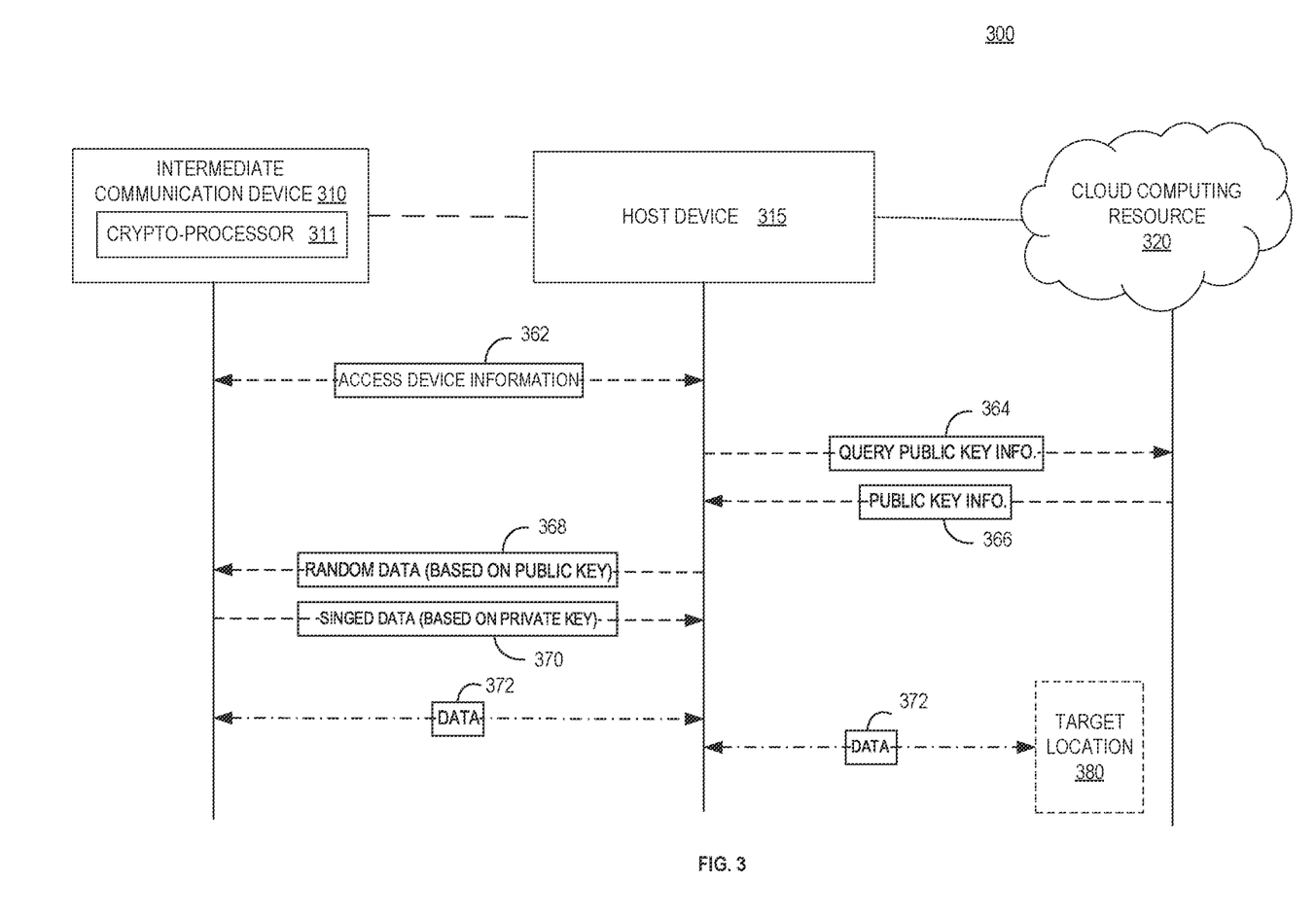
FIG. 3 illustrates a schematic view of an interaction diagram showing interaction among various devices to authenticate an intermediate communication device, according to some examples.

FIG. 3 illustrates a schematic view of interaction diagram 300 showing an interaction among various devices for authentication of an intermediate communication device 310, in accordance with an example. The intermediate communication device 310 may be plugged into a host device 315. In some other examples, the intermediate communication device 310 may be wirelessly connected to the host device 315. For example, the wireless connection may be based on Bluetooth, Bluetooth Low Energy (BLE), ZigBee, Radio-frequency identification (RFID), Z-Wave, near field communication (NFC), etc.

Upon connecting the intermediate communication device 310 to the host device 315, the host device 315 may access device information stored on the intermediate communication device 310. In some examples, before accessing the device information, the host device 315 may receive a device authorization policy. Based on the device authorization policy, the host device 315 may determine whether it is authorized to communicate with the intermediate communication device 310. For example, the device authorization policy may be a positive list defining various conditions (e.g., accepted manufacturers, or accepted communication standards) or a negative list for acceptance of communication with an intermediate communication device. In some examples, the device authorization policy may be stored in a cloud computing resource. The host device 315 is configured to access the device authorization policy from the cloud computing resource, as part of the authentication process discussed herein.

As part of accessing device information 362, the host device 315 may access device information including a unique identifier, communication standard(s) supported by the intermediate communication device 310, manufacturer details, etc. In some examples, the communication standard(s) may be accessed to determine compatibility with the host device 315. In some other examples, the manufacturer details, etc. may be used to receive any drivers that are required by the host device 315 for authentication/communication with the intermediate communication device.

Further, based on the identification of device information (i.e., unique identifier), the host device 315 may query for public key information 364 from a cloud computing resource 320. For example, the cloud computing resource may include an Infrastructure as a Service (IaaS), which may host equipment, such as, servers, storage components, network devices, etc. In some examples, the cloud computing resource 320 may include an ownership account securely storing device information associated with the intermediate communication device 310 related information. Examples of ownership account are discussed in FIG. 5. In some examples, the process to query public key information may include the host device 315 to connect to the cloud computing resource 320 via a secure connection, and an authorization request is performed via the secure connection. In response to successful authorization of the host device 315, the host device 315 may request the cloud computing resource 320 for the public key corresponding to the identified unique identifier. The authorization request may include submitting identity information by the host device 315. The identity information may include a piece of authorization information, a digital signature, etc.

In some examples, if the authorization or verification of the host device 315 fails, then the process of querying is terminated, and the secure connection may also be terminated by the cloud computing resource 320.

In some examples, the cloud computing resource 320 and/or host device 315 may perform at least one of encryption, authentication, or certificate verification operations to establish a secure connection. In further examples, the secure connection may comprise a secure sockets connection (i.e., Secure Socket Layer based connecting), Transport Layer Protocol (TLP), Hyper Text Transfer Protocol Secure (HTTPS), or the like, Through the secure connection, the host device 315 receives public key information 366 associated with the intermediate communication device 310. In some examples, establishing a secure connection with the cloud computing resource 320 may include login credentials such as a username/password. The login credentials may be communicated from the host device 315 to the cloud computing resource 320 via standard packets (such as Link Layer Discovery Protocol (LLDP) or Border Gateway Protocol (BGP)) or a custom packet format.

In some examples, the host device 315 may use an asymmetric key algorithm to authenticate the intermediate communication device 310. Based on the public key, the host device 315 generates random data. The host device 315 includes a processor (e.g., processor 205 as illustrated in FIG. 2) capable of performing a random data generation operation. In some instances, the host device 315 may be configured to generate a random big number (bignum). Bignum may be used for the representation of arbitrarily large integers that are used for authentication. However, in some other instances, the host data may generate other forms of random data. The random data is sent 368 to the intermediate communication device 310 for signing using the private key stored therein.

The intermediate communication device 310 may sign the random data using a private key that is securely stored in the intermediate communication device 310. For example, the intermediate communication device 310 may use the received random data and perform the signing process using the private key to generate a signed data. Examples of generation of the signed data may include encrypting the random data using the private key. In some examples, the private key may be stored in secure hardware such as a Trusted Platform Module (TPM) that is integrated with the intermediate communication device 310. Until the intermediate communication device 310 is authenticated, the host device 315 may allow only the authentication-related communication to occur between the host device 315 and the intermediate communication device 310. The intermediate communication device 310 may communicate the signed data 370 to the host device 315. The host device 315 may verify the signature based on the public key information queried and obtained from the remote resource. Examples of signature verification may include decrypting the signed data using the public key. The host device 315 may compare the decrypted data with the random data that it has generated. In some other examples, the host device 315 may verify the signature of the signed data using the private key. For example, a mismatch between the decrypted data and the random data may be considered a failure of authentication.

Upon a failure of authentication of the intermediate communication device 310, the host device 315 may alert a control node or a network administrator about an unauthenticated device being plugged in or communicatively coupled thereto. In further examples, the host device may cease further communication with the intermediate communication device 310.

In response to successful authentication of the intermediate communication device 310 (, the host device 315 connects clients (e.g., the IoT devices 105 of FIG. 1) to connect to a network. Further, data 372 generated by the client devices are sent to a target location 380. In other words, the intermediate communication device 310 may be allowed to perform a full-fledged operation of—communicating data 372 received from IoT devices to the target location 380 via the host device 315.

In some alternative examples, the intermediate communication device 310 may include a crypto-processor 311. The crypto-processor 311 may be a stand-alone component or may be integrated with the processor (i.e., processor 205 of FIG. 2) thereof. During manufacturing or at the manufacturer end, the crypto-processor 311 may be configured to generate device information including a public key, a private key, and a unique identifier. The public key and unique identifier may be stored in an ownership account. The private key may be securely stored in intermediate communication device 310.

Figure 4A:
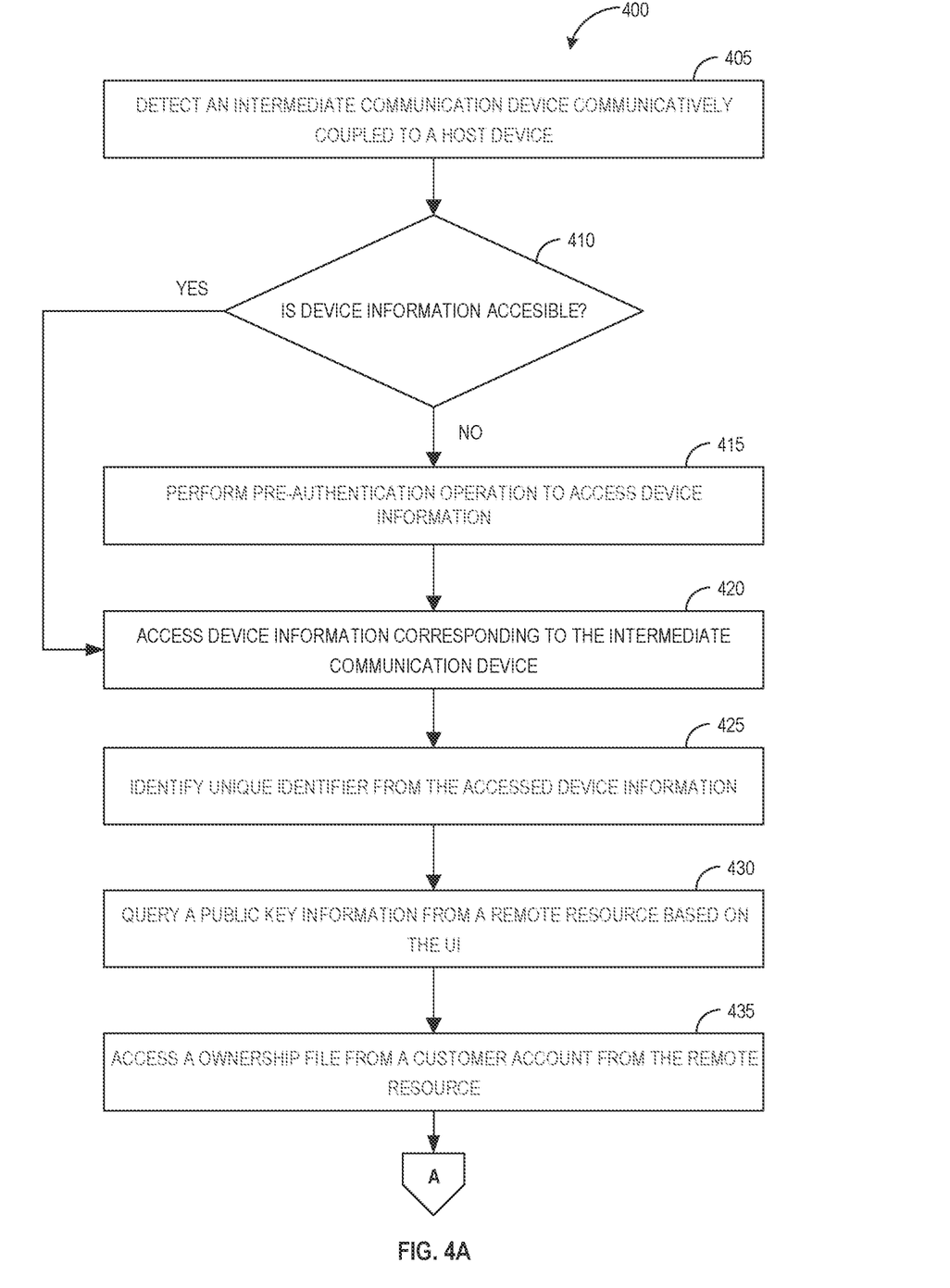
FIG. 4A illustrates a flow diagram illustrating a process for authenticating an intermediate communication device by a host device, according to some examples.
Figure 4B:
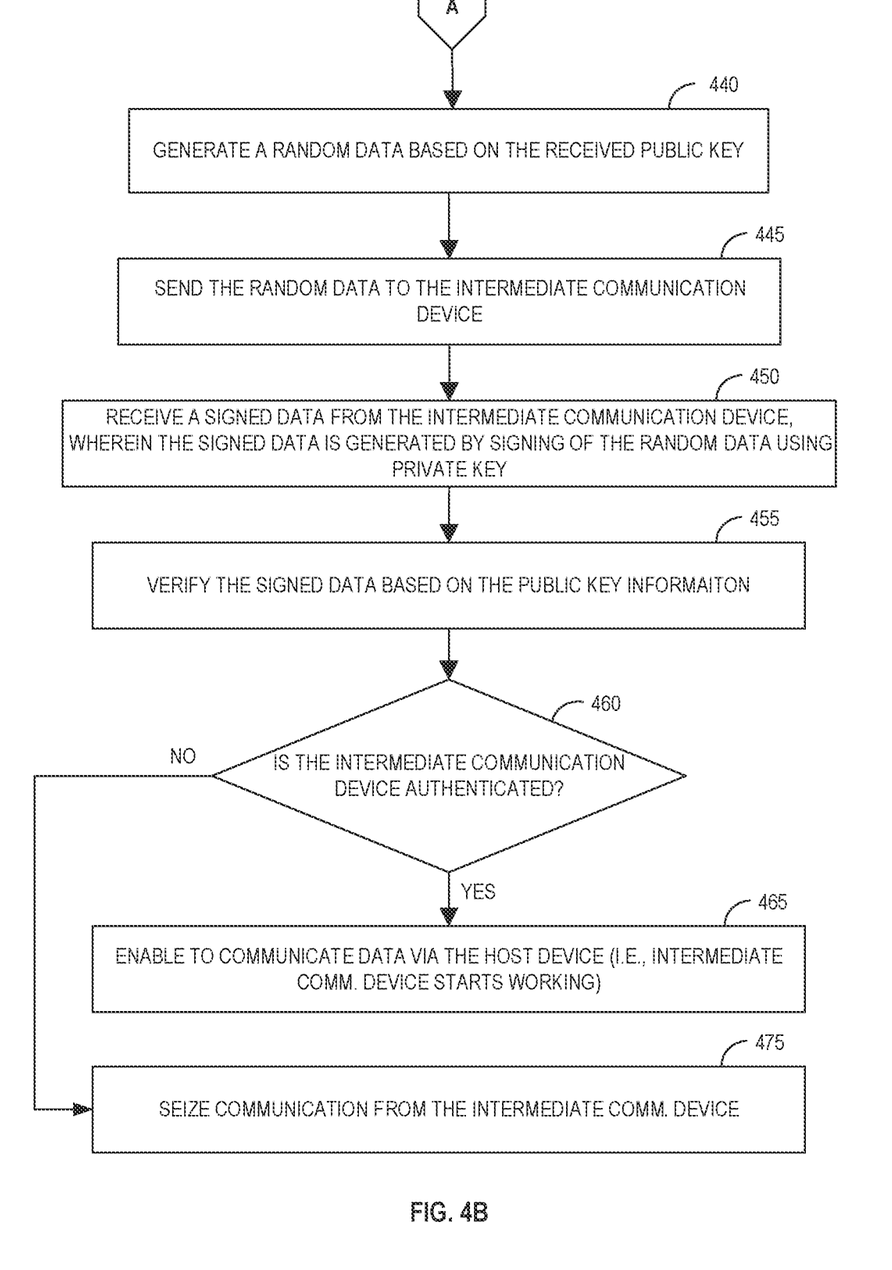
FIG. 4B illustrates a continuation of a flow diagram illustrated in FIG. 4A, according to some examples.

FIGS. 4A and 4B illustrate a flow diagram 400 for a method to authenticate intermediate communication device by a host device, according to some examples. The flow diagram 400 may be executed as instructions on a machine (e.g., by a processor). The instructions may be included on a storage medium (e.g., a non-transitory machine-readable storage medium). The flow diagram 400 illustrates blocks 405-475 and may include other actions described herein. Additionally, although the blocks are shown in an order, the blocks are depicted in FIGS. 4A and 43, may be performed in any order and at any time. Also, some of the blocks shown in flow diagram 400 may be omitted without departing from the spirit and scope of this disclosure. In some examples, blocks 405-475 may be implemented on a host device, such as an access point, according to some examples described herein.

At 405, a host device, such as a host device 115, 200, 315, may detect an intermediate communication device communicatively coupled to the host device, as per some examples. In some examples, the host device may scan for any communication devices that are physically connected to its ports (e.g., USB ports) or placed within its proximity. In response to the detection of a communication device, such as the intermediate communication device discussed herein, the host device may determine communication compatibility and/or requirement of drivers corresponding to the intermediate communication device. For example, the host device may obtain and install drivers for communicating with the intermediate communication device.

At 410, in some examples, the host device may check if device information stored on the intermediate communication device is accessible. In some examples, the intermediate communication device may be embedded with a pre-authentication algorithm. In response to identifying any pre-authentication algorithm, the host device may determine that the device information is inaccessible by the host device.

At 415, based on a determination that the information from the intermediate communication device is inaccessible, the host device may perform a pre-authentication process to access device information. In some examples, the pre-authentication process may include entering a password for verification. In some examples, the password may be communicated to a network administrator or the host device from a manufacturer of the intermediate communication device. Upon successful pre-authentication, the pre-authentication algorithm may enable access to the device information, such as unique identifier, supported standards, make, etc. In some examples, the device information at least in part is made available to the host device.

Based on a determination, at 410, that the device information is accessible by the host device without any pre-authentication process, at 420, the host device may access device information.

At 425, the host device may identify a unique identifier from the accessed device information. The unique identifier may be a serial number, alpha-numeric, etc. In some examples, the unique identifier may be global. The unique identifier in association with the make (i.e., manufacturer) may make it distinguishable from other intermediate communication devices or similar components.

At 430, the host device may query public key information from a remote resource, based on the identified device information. For example, the process of querying may include accessing the public key from an ownership account. In some examples, the host device may be configured with information corresponding to the local servers and/or with credentials for accessing a cloud computing resource. The credentials may include an internet protocol (IP) address, Media Access Control (MAC) address, or login-password details. The ownership account may be stored in the local server or the cloud computing resource.

For example, as discussed in FIG. 3, the ownership account may include a customer account and the public key may be stored in an ownership file. The ownership file may be unique to an intermediate communication device and may be identified based on the unique identifier. In some other examples, the host device may be deployed without access to a remote resource such as a cloud computing resource. In such examples, a local server may be configured to maintain ownership account and ownership files. The host device may access the local server for the public key information. In some alternative examples, based on the accessed device information, the host device may additionally query ownership information of the intermediate communication device from the manufacturer. Based on the received ownership information, an associated remote resource may be identified for querying public key information.

At 435, the host device may access an ownership file from a customer account available in the remote resource. In other words, the host device may receive the public key information from the ownership file.

Figure 5:
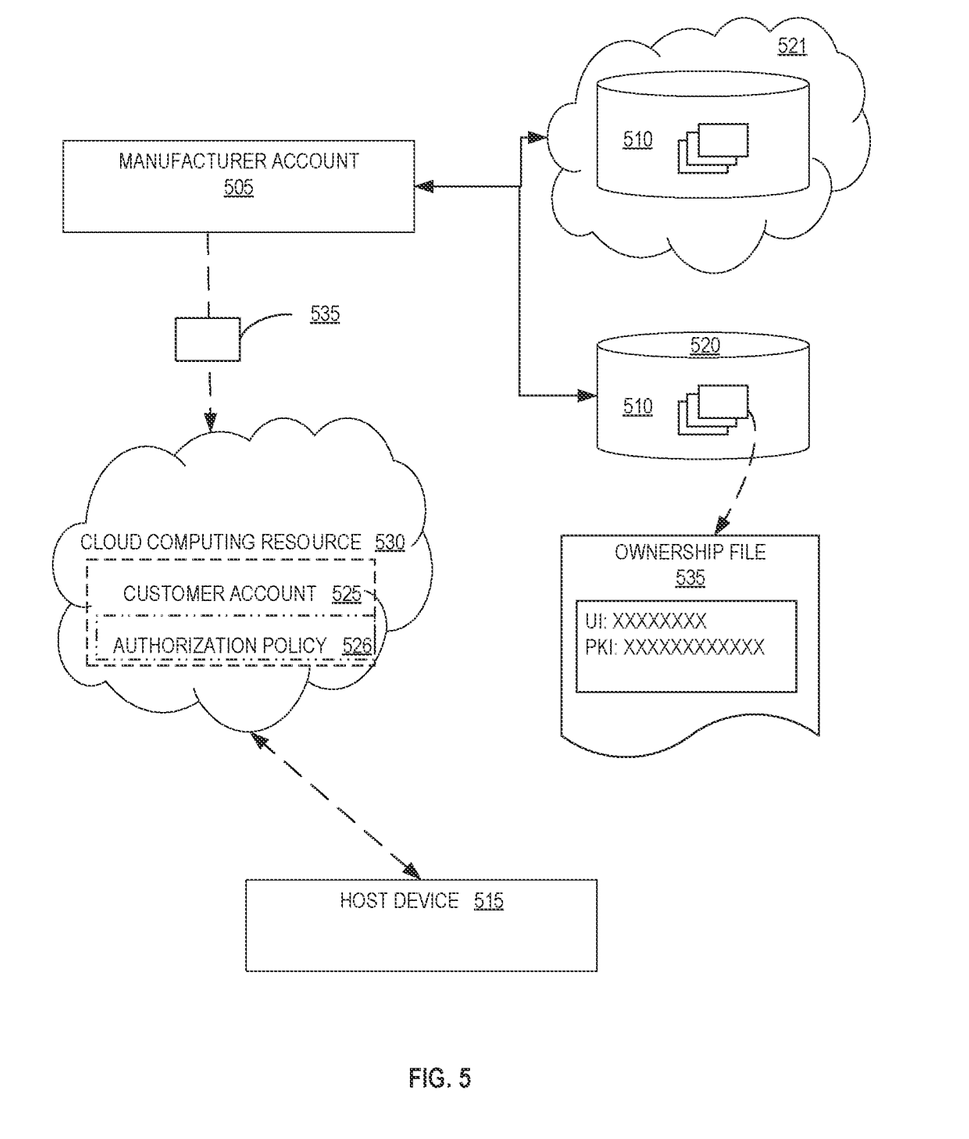
FIG. 5 illustrates a schematic view of an environment illustrating ownership transfer corresponding to device information of an intermediate communication device, according to some examples.

Reference may be made to FIG. 5 that illustrates an ownership transfer mechanism, according to some examples. For each intermediate communication device, the manufacturer may create ownership information or ownership file associated with the intermediate communication device. In some examples, during manufacturing, the intermediate communication device may be configured to generate a public key, private key, and a unique identifier. In some examples, the intermediate communication device may include a TPM component or any other security standard component that generates the keys. The generation of keys may be performed as part of the manufacturing process of the intermediate communication device. The public key and the unique identifier may be stored in the ownership file by the manufacturer, as per some examples. In some other examples, the ownership account may be stored in a cloud computing resource that is secured by the manufacturer.

Further, in some examples, an end-user/customer/network administrator of the host device may avail cloud services such as Infrastructure as a Service (IaaS) or Platform as a Service (PaaS). The ownership account or the ownership file may be transferred from the manufacturer to the aforementioned cloud services. A customer account may be created in the cloud services for storing ownership-related information (e.g., ownership file). In some examples, the customer account may hold multiple ownership files comprising details that are associated with the intermediate communication device devices of the customer.

FIG. 5 illustrates a schematic view of an environment illustrating ownership transfer corresponding to device information of an intermediate communication device. Herein, a manufacturer account 505 may correspond to a manufacturer of an intermediate communication device. A manufacturer account 505 may have access to a plurality of ownership files 510 that correspond to intermediate communication devices that are manufactured by the manufacturer. In some examples, the plurality of ownership files 510 may be stored in storage disks 520 or a cloud storage 521. Each ownership file may comprise information (e.g., public key) corresponding to a specific intermediate communication device. A cloud computing resource 530 may be an example of a remote resource associated with a host device 515. The cloud computing resource 530 may host a customer account 525. The host device 515 may be configured with credentials to access the cloud computing resource 530 and the customer account 525.

For example, an ownership file 535, out of the plurality of ownership files 510, may correspond to an intermediate communication device of interest. After a sale of the intermediate communication device, the manufacturer may transfer the ownership file 535 to the customer account 525, which is hosted on the cloud computing resource 530. The host device 515 may query for public key information from the cloud computing resource 530 with appropriate credentials. Based on the verification of credentials, the host device 515 may receive public key information from the cloud computing resource 530.

In some additional examples, the customer account 525 may include a device authorization policy 526. The device authorization policy 526 may be defined by a network administrator. The host device may access the device authorization policy 526 to determine if it is authorized to work in conjunction with the intermediate communication device.

The device authorization policy 526 may include an allowed or barred list of unique identifiers, or manufacturers. In some alternate examples, the device authorization policy 526 may be stored in a local server (i.e., another example of a remote resource) or may be pushed to the host device 515 by a backend control service of the network.

Referring back to FIGS. 4A and 4B, at 440, the host device may generate random data based on the public key that is accessed. The host device may include a processor (e.g., processor 205 as shown in FIG. 2) that is capable of performing the random data generation operation. The host device is configured to perform the processing intense operations such as accessing the remote resource via secure connection, generation and sending of random data, etc.

At 445, the host device may send the random data to the intermediate communication device for performing a signing operation. The private key is securely stored in the intermediate communication device and is used for signing the random data, such as a bignum or the like. The private key is protected from interception by unauthorized third parties, etc.

At 450, the host device may receive a signed data from the intermediate communication device, where the signed data is generated by signing the random data using a private key.

At 455, the host device may verify the signed data based on the public key received from the remote resource. At 460, the host device may determine whether the intermediate communication device is authenticated. Based on a determination that the intermediate communication device is authenticated. at 465, the host device enables the operation of the intermediate communication device whereby the intermediate communication device may direct data received from IoT device(s) to a target location.

Figure 6:
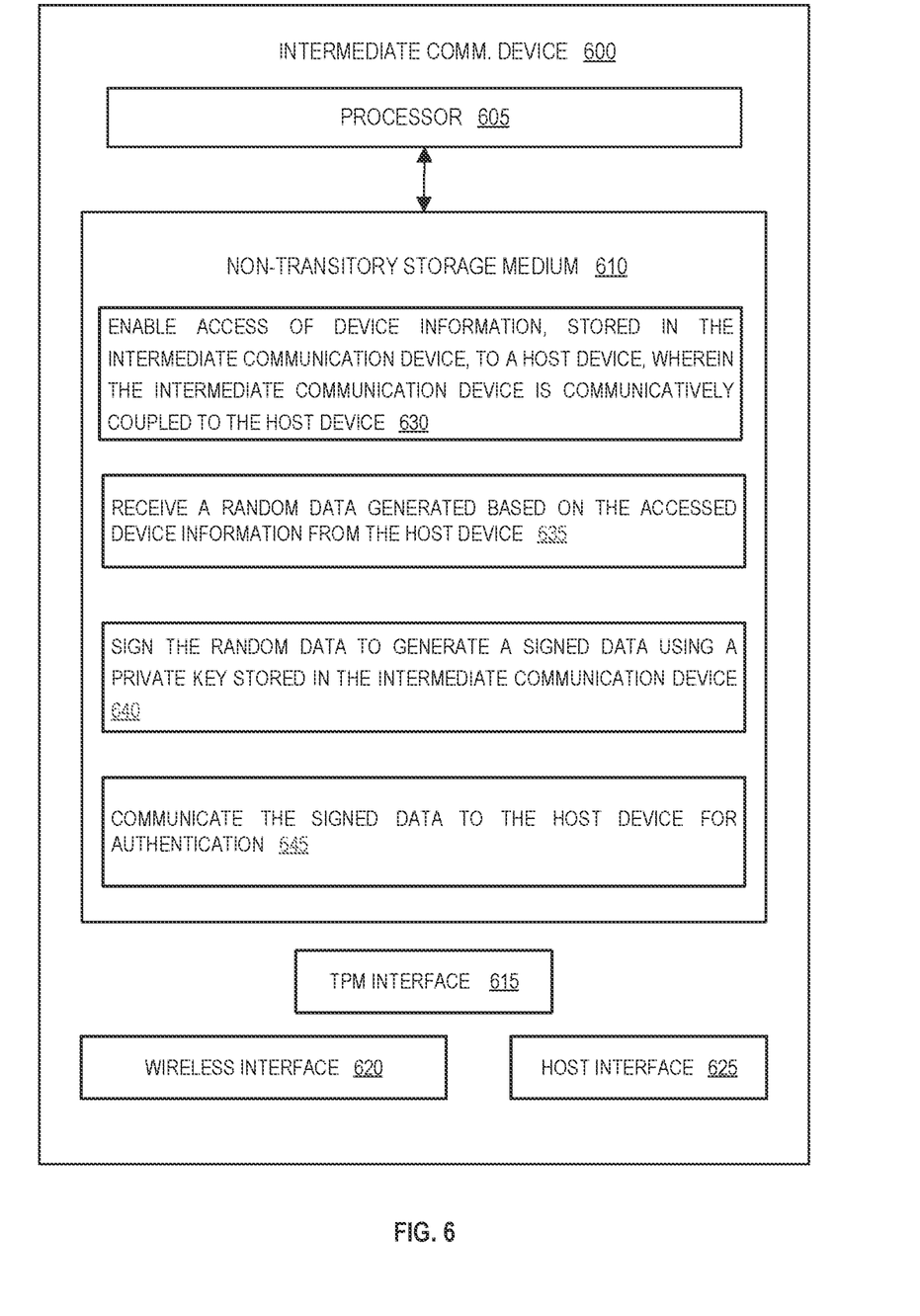
FIG. 6 illustrates a schematic block diagram of an intermediate communication device, according to some examples.

Based on a determination that the intermediate communication device is not authenticated, at 460, the host device may cease communication with the intermediate communication device. In further examples, the host device may roll back one or more operations performed during the authentication process, such as installation of support software, etc. In FIG. 6 depicts a block diagram of an intermediate communication device 600 that is authenticated by a host device, according to some examples. The intermediate communication device includes a processor 605 and a storage medium 610. The intermediate communication device 600 may include a Trusted Platform Module (TPM) interface 615, a wireless interface 620, and a host interface 625. Further, the storage medium 610 may include instructions 630-645 that may be accessible by the processor 605. The instructions 630-645, executable by the processor, causing the processor to perform one or more actions as discussed below.

In some examples, the intermediate communication device 600 may be communicatively coupled to a host device (e.g., host device 200 as shown in FIG. 2) via the host interface 625. The processor 605 may execute instructions 630 that cause the processor 605 to enable device information stored on it to be accessible by a host device. In some examples, the device information that is enabled for access may include a unique identifier, among other information. The intermediate communication device may allow access to the unique identifier without any pre-authentication process. In some other examples, the intermediate communication device may enable device information to be accessible by a host device, based on a successful pre-authentication by the host device. The successful pre-authentication process may include providing a password, credentials, or the like for authorized access of device information.

In some examples, processor 605 may execute instructions 635 that cause the processor 605 to receive random data generated based on the accessed device information from the host device. The host device may be configured to handle process intense actions, such as the generation of random data. The random data may be generated based on public key information, which is associated with the intermediate communication device.

In some examples, processor 605 may execute instructions 640 that cause the processor 605 to sign the random data to generate a signed data using a private key stored in the intermediate communication device 600. Examples of signing the random data may also include hashing the random data. The hashed random data and the private key may be used to generate a signature. The signature may be appended with the random data to generate the signed data. Herein, hashing may use a hash function to map data of arbitrary size to a fixed size. The private key may be securely stored in the intermediate communication device 600. For example, the intermediate communication device 600 may include a TPM interface 615 that stores the private key. Processor 605 may execute instructions that cause the TPM interface to sign the random data thereby generating a signed data.

In some examples, processor 605 may execute instructions 645 that cause the processor 605 to communicate the signed data to the host device for authentication. Based on the host device authenticated, the intermediate communication device 600, the processor 605 may execute instructions that cause the processor 605 to start data-related operations of the intermediate communication device 600. Examples of authenticating the signed data may include hashing the signed data. Verifying the random data using the hashed singed data, the appended signature, and the public key. In some alternate examples, a Rivest-Shamir-Adleman (RSA), a Digital Signature Algorithm (DSA), or the like may be used. The data-related operations may include sending data, received from IoT devices, to the host device. The intermediate communication device 600 may receive data from the IoT devices via the wireless interface 620.

According to the examples described herein, the device 200, 600 may be a computing device including processor 205, 605 may hardware processors for processing information. Hardware processor(s) may be, for example, one or more general-purpose microprocessors. A storage medium 210, 610, such as a magnetic disk, optical disk, or USB thumb drive (Flash drive), etc., may store information and instructions. Device 200, 600 may include random-access memory (RAM), cache, and/or other dynamic storage devices, for storing information. In some examples, the main memory may be provided for storing temporary variables or other intermediate information during the execution of instructions to be executed by processors 205, 605.

The computing device may be coupled to a display for displaying information to a user, such as a network administrator. The computing device may include an input device for providing information and command selections. The computing device may include a user interface for interaction thereof. Further, the computing device may include software components, object-oriented software components, class components, and task components, processes, functions, attributes, procedures, subroutines, segments of program code, drivers, firmware, microcode, circuitry, data, databases, data structures, tables, arrays, and variables.

Herein, the terms "component," "interface," "system," "database," etc. can refer to logic embodied in hardware or firmware, or to a collection of software instructions. Such software code may be stored, partially or fully, on a memory device of the executing computing device, for execution by the computing device. Software instructions may be embedded in firmware, such as an erasable programmable read-only memory (EPROM). It will be further appreciated that hardware components may be comprised of connected logic units, such as gates and flip-flops, and/or may comprise programmable units, such as programmable gate arrays or processors.

The device 200, 600 may implement techniques described herein using customized hard-wired logic, one or more ASICs or FPGAs, firmware, and/or program logic. According to some examples, techniques or actions described herein may be performed by a computing device in response to processor(s) executing one or more sequences of one or more instructions stored in a non-transitory storage medium. In further examples, instructions may be read into the main memory from another storage medium.

The terms "non-transitory," and similar terms, as used herein refers to any media that store data and/or instructions that cause a machine to operate in a specific fashion. Such non-transitory media may comprise non-volatile media and/or volatile media. Non-transitory media is distinct from but may be used in conjunction with transmission media. Transmission media participates in transferring information between non-transitory media. For example, transmission media includes coaxial cables, copper wire, and fiber optics, including the wires that comprise the bus. Transmission media can also take the form of acoustic or light waves, such as those generated during radio-wave and infra-red data communications.

The computing device includes a communication/network interface that provides two-way data communication. For example, a communication interface may be an integrated services digital network (ISDN) card, cable modem, satellite modem, or a modem to provide a data communication connection to a corresponding type of telephone line. As another example, a network interface may be a local area network (LAN) card to provide a data communication connection to a compatible LAN (or WAN component to communicated with a WAN). Wireless links may also be implemented. In any such example, the network interface sends and receives electrical, electromagnetic, or optical signals that carry digital data streams representing various types of information. The computing device can send messages and receive data, including program code, through the network(s), network link, and communication interface. In the Internet example, a server might transmit a requested code for an application program through the Internet, an internet service provider (ISP), the local network, and the communication interface.

Each of the processes, methods, and flow diagrams described in the preceding sections may be embodied in, and fully or partially automated by, code components executed by one or more computer systems or computer processors comprising computer hardware. One or more computer systems or computer processors may also operate to support the performance of the relevant operations in a "cloud computing" environment or as a "software as a service" (SaaS). The processes and algorithms may be implemented partially or wholly in application-specific circuitry. The various features and processes described above may be used independently of one another or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate or may be performed in parallel, or some other manner. Blocks or states may be added to or removed from the disclosed examples. The performance of certain operations or processes may be distributed among computer systems or computers processors, not only residing within a single machine but deployed across a number of machines.

In the foregoing detailed description of the present disclosure, reference is made to the accompanying drawings that form a part hereof, and which is shown by way of illustration how examples of the disclosure may be practiced. These examples are described in sufficient detail to enable those of ordinary skill in the art to practice the examples of this disclosure, and it is to be understood that other examples may be utilized and that process, electrical, and/or structural changes may be made without departing from the scope of the present disclosure.

What is claimed is:

1. A non-transitory machine-readable storage medium comprising instructions, the instructions executable by a host device to:
    access device information corresponding to an intermediate communication device communicatively coupled to the host device;
    identify a unique identifier corresponding to the intermediate communication device from the accessed device information;
    query, by the host device, a remote resource for a public key corresponding to the identified unique identifier;
    based on the query, receive, at the host device, the public key from the remote resource;
    generate random data and send the random data to the intermediate communication device;
    receive, from the intermediate communication device, signed random data produced by the intermediate communication device by signing the random data with a private key stored in the intermediate communication device;
    authenticate, by the host device, the intermediate communication device based on the signed random data signed with the private key stored in the intermediate communication device; and
    based on the authentication of the intermediate communication device, communicate, by the host device to a target location, sensor data of a sensor in electronic device received at the host device through the intermediate communication device.

2. The non-transitory machine-readable storage medium of claim 1, wherein the instructions to authenticate the intermediate communication device comprise instructions to:
    verify the received signed random data using the public key; and
    based on a determination that the signed random data is verified, confirm that the intermediate communication device is authenticated.

3. The non-transitory machine-readable storage medium of claim 1, wherein the instructions to access the device information corresponding to the intermediate communication device comprise instructions to:
    access the device information stored on the intermediate communication device.

4. The non-transitory machine-readable storage medium of claim 1, wherein the public key is received at the intermediate communication device from an ownership account, the ownership account corresponding to the identified unique identifier, and wherein the ownership account is stored on the remote resource.

5. The non-transitory machine-readable storage medium of claim 1, wherein the remote resource is a cloud computing resource.

6. The non-transitory machine-readable storage medium of claim 2, wherein the verifying of the received signed random data comprises:
decrypting the received signed random data using the public key to produce decrypted data, and
comparing the decrypted data with the random data generated by the host device.

7. The non-transitory machine-readable storage medium of claim 1, wherein the authenticating of the intermediate communication device uses an asymmetric-key algorithm.

8. The non-transitory machine-readable storage medium of claim 1, wherein the host device comprises an access point that includes the non-transitory machine-readable storage medium comprising the instructions.

9. The non-transitory machine-readable storage medium of claim 1, wherein the host device comprises a router that includes the non-transitory machine-readable storage medium comprising the instructions, or a gateway.

10. A host device comprising:
a processor; and
a non-transitory storage medium comprising instructions executable on the processor to:
access device information corresponding to an intermediate communication device that is communicatively coupled to the host device;
identify a unique identifier corresponding to the intermediate communication device from the accessed device information;
query a remote resource for a public key corresponding to the identified unique identifier;
based on the query, receive, at the host device, the public key from the remote resource;
generate random data and send the random data to the intermediate communication device;
receive, from the intermediate communication device, signed random data produced by the intermediate communication device by signing the random data with a private key stored in the intermediate communication device;
authenticate the intermediate communication device based on the signed random data signed with the private key stored in the intermediate communication device; and
based on the authentication of the intermediate communication device, communicate, by the host device to a target location, sensor data of a sensor in an electronic device received at the host device through the intermediate communication device.

11. The host device of claim 10, wherein the instructions are executable on the processor to generate the random data based on the public key received from the remote resource.

12. The host device of claim 10, wherein the host device comprises an access point that includes the processor and the non-transitory storage medium comprising the instructions.

13. The host device of claim 10, wherein the host device comprises a router that includes the processor and the non-transitory storage medium comprising the instructions.

14. The host device of claim 10, wherein the instructions are executable on the processor to:
access a device authorization policy stored in an ownership account of the host device; and
determine whether the intermediate communication device is authorized to work in conjunction with the host device.

15. The host device of claim 10, wherein the instructions are executable to authenticate the intermediate communication device by:
decrypting the received signed random data using the public key to produce decrypted data, and
comparing the decrypted data with the random data generated by the host device.

16. An intermediate communication device, comprising:
a memory to store a private key and device information comprising a unique identifier of the intermediate communication device;
a processor; and
a storage medium comprising instructions executable on the processor to:
send, from the intermediate communication device to a host device, the device information;
receive, at the intermediate communication device from the host device, random data generated at the host device based on a public key corresponding to the unique identifier, the public key obtained by the host device from a remote resource;
sign the random data to generate signed random data using the private key stored in the memory of the intermediate communication device; and
communicate the signed random data to the host device for authentication of the intermediate communication device using the public key and the signed random data signed with the private key,
wherein the intermediate communication device is to pass sensor data of a sensor in an electronic device through the intermediate communication device to the host device after the authentication of the intermediate communication device.

17. The intermediate communication device of claim 16, wherein the instructions are executable on the processor to:
provide, from the intermediate communication device, the device information to the host device in response to a compliance with a pre-authentication process by the host device.

18. The intermediate communication device of claim 16, wherein the intermediate communication device includes a Universal Serial Bus (USB) device, and the intermediate communication device is pluggable to the host device.

19. The intermediate communication device of claim 16, wherein the intermediate communication device comprises a wireless interface, and the intermediate communication device is to communicate with the electronic device via the wireless interface.

20. The intermediate communication device of claim 16, wherein the authentication of the intermediate communication device uses an asymmetric-key algorithm.

* * * * *